United States Patent Office 2,848,458
Patented Aug. 19, 1958

2,848,458

5-OXO-1,3-DITHIANES

Edward G. Howard, Jr., Wilmington, Del., assignor to E. I. du Pont de Nemours and Company, Wilmington, Del., a corporation of Delaware No Drawing. Application October 20, 1954
Serial No. 463,620

7 Claims. (Cl. 260—327)

This invention relates to new heterocyclic compounds and to their preparation.

This invention has as an object new chemical intermediates. A further object is the provision of new 5-oxo-1,3-dithianes possessing high molecular extinction coefficients. A still further object is the provision of 5-oxo-1,3-dithianes useful as chemical intermediates and dyestuffs. Other objects will appear hereinafter.

These objects are accomplished by the present invention of 5-oxo-1,3-dithianes having, attached to at least one of the 4 and 6 carbons, a bivalent substituent wherein the two valences of the substituent stem from carbon conjugated with an aromatic ring, preferably conforming to the formula $R \cdot (CH=CH)_n \cdot C=$, in which R is selected from the group of aryl, furyl, pyrryl, thienyl, and pyridyl, and $n$ is a cardinal number not greater than two. The compounds preferably have, on the 2-carbon, either hydrogen or a substituent of the kind more specifically described below. The compounds are prepared by condensing, under basic conditions, an aldehyde, in which the aldehyde carbon is in conjugation with a carbon which is part of a cyclic structure, e. g., an aromatic ring, with a 5-oxo-1,3-dithiane having two hydrogens each on one or both of the 4 and 6 carbons and preferably having on the 2-carbon either hydrogen or a substituent, e. g., hydrocarbon, alkoxy or aryloxy hydrocarbon, or a halohydrocarbon radical in which the halogen is attached to a carbon which in turn is attached to another carbon by a double bond, etc.

In a conveniently practical method of preparing the benzylidene substituted 5-oxo-1,3-dithianes of this invention a reactor is charged with a solution of the 5-oxo-1,3-dithiane in an organic solvent, e. g., an alcohol. To the solution there is then added at least one mole of the aldehyde per mole of the 5-oxo-1,3-dithiane and a catalytic amount of a base, e. g., piperidine. The mixture is allowed to stand at room temperature for from one to sixty days. The product which forms is separated and purified by recrystallization, distillation or other methods known to those skilled in the art.

The molecular extinction coefficients, $\epsilon$, given in the following examples are values calculated by means of the equation:

$$\epsilon = \frac{1}{ct} \log \frac{I_0}{I}$$

where $I_0$ is the incident light intensity, I is the final intensity after passing through a thickness $t$ of concentration $c$ moles per liter (see page 260 in "Quantum Chemistry" by K. S. Pitzer, Prentice-Hall, Inc., New York (1953)).

The examples are illustrative of the invention.

EXAMPLE I

To a solution of 1.34 g. (0.01 mole) of 5-oxo-1,3-dithiane and 2.33 g. (0.022 mole) of benzaldehyde in 25 ml. of ethanol there was added two drops of piperidine. The solution slowly turned bright yellow. After standing one week at room temperature, the intensely yellow crystals which had formed were separated and dried. The weight was 2.42 g. (78% of theory). Recrystallization from ethanol gave a product, 4,6-dibenzylidene-5-oxo-1,3-dithiane, melting at 147°–148.5° C., at 317 mμ, $\epsilon=12,400$ and at 271 mμ, $\epsilon=18,910$.

Analysis.—Calculated for $C_{18}H_{14}S_2O$: C, 69.05%; H, 4.55%; S, 20.66%. Found: C, 70.03%, 69.82%; H, 4.79%, 4.70%; S, 20.81%.

EXAMPLE II

To a solution of 2.06 g. (0.01 mole) of 4-ethoxycarbonyl-5-oxo-1,3-dithiane and 1.49 g. (0.01 mole) of p-N,N-dimethylaminobenzaldehyde in 15 ml. of ethanol there was added 2 drops of piperidine. The mixture was then stored for 4 days at room temperature, at the end of which time the bright red solid began to form. It amounted to 0.30 g. (10% of theory). After recrystallization from ethanol the product, 6-[p-N,N-dimethylaminobenzylidene] - 4 - ethoxycarbonyl - 5 - oxo - 1,3 - dithiane, melted at 132°–133° C., at 428 mμ, $\epsilon=25,275$.

Analysis.—Calculated for $C_{16}H_{19}S_2NO_3$: N, 4.16%. Found: N, 4.06%.

EXAMPLE III

To a solution of 2.06 g. (0.01 mole) of 4-ethoxycarbonyl-5-oxo-1,3-dithiane and 2.12 g. (0.02 mole) of benzaldehyde in 15 ml. of ethanol there was added 2 drops of piperidine. The mixture was allowed to stand at room temperature for two months, at which time a mass of yellow crystals had formed. The crude crystals were separated, dried, and found to weigh 2.5 g. After recrystallization from petroleum ether the product, 6-benzylidene - 4 - ethoxycarbonyl - 5 - oxo - 1,3 - dithiane, was found to melt at 70°–71° C., at 397 mμ, $\epsilon=12,400$ and at 271 mμ, $\epsilon=18,910$.

Analysis.—Calculated for $C_{14}H_{14}S_2O_3$: C, 57.12%; H, 4.79%; S, 21.78%. Found: C, 57.29%; H, 4.95%; S, 21.98%.

EXAMPLE IV

To a solution of 1.74 g. (0.0130 mole) of 5-oxo-1,3-dithiane and 5.00 g. (0.0286 mole) of para-N,N-dimethylamino-cinnamaldehyde in 210 ml. of ethanol was added 2 ml. of piperidine. The solution was allowed to stand at room temperature for four days, during which time a black crystalline product separated. This was collected, washed with ethanol, and dried. The product weighed 4.44 g. (76.2% theoretical). After recrystallization from n-butanol the product, 4,6-di-(p-N,N-dimethylaminocinnamylidene) - 5 - oxo - 1,3 - dithiane, melted at 198°–200° C., and at 478 mμ, $\epsilon=26,900$.

Analysis.—Calculated for $C_{26}H_{28}S_2ON_2$: C, 69.62%; H, 6.20%; N, 6.25%. Found: C, 67.82%; H, 6.46%; N, 6.10%.

EXAMPLE V

To a solution of 2.50 g. (0.0121 mole) of 4-ethoxycarbonyl 5 - oxo - 1,3 - dithiane and 2.40 g. (0.0134 mole) of para - N,N - dimethylaminocinnamaldehyde in 150 ml. of ethanol was added 2.5 ml. of piperidine. The solution was allowed to stand at room temperature for three days, the product collected, washed with ethanol, and dried. It weighed 2.59 g. (59% of theoretical). It was recrystallized by covering it with hot ethanol and adding benzene to the point of incipient precipitation. The product, 6 - (p - N,N - dimethylaminocinnamylidene) - 4-ethoxycarbonyl - 5 - oxo - 1,3 - dithiane, melted at 152°–153° C., at 464 mμ, $\epsilon=39,250$.

Analysis.—Calculated for $C_{18}H_{21}S_2O_3N$: C, 59.49%; N, 5.83%. Found: C, 59.78%; N, 5.97%.

EXAMPLE VI

To a hot solution of 3.00 g. (0.0148 mole) of 4-ethoxycarbonyl - 5 - oxo - 1,3 - dithiane and 3.64 g. (0.0160 mole) of p - (bis - β - cyanoethylamino)benzaldehyde in 300 ml. of ethanol was added 2 ml. of piperidine catalyst, and the solution was stored at room temperature for four days. The yellow-orange product was collected, washed with ethanol, and dried. Its weight was 2.77 g. or 46% of theoretical. The material was recrystallized by covering with about 40 ml. of hot ethanol and adding benzene to the point of incipient precipitation. The product, 6 - [p - N - (bis - beta - cyanoethylamino)benzylidene] - 4 - ethoxycarbonyl - 5 - oxo - 1,3 - dithiane, melted at 159°–160.5° C., at 409 m$\mu$, $\epsilon$=23,650.

*Analysis.*—Calculated for $C_{20}H_{21}S_2O_3N_3$: C, 57.83%; H, 5.10%; N, 10.12%. Found: C, 58.30%; H, 5.03%; N, 10.19%.

EXAMPLE VII

To a hot solution of 0.75 g. (0.0056 mole) of 5 - oxo - 1,3-dithiane and 2.79 g. (0.0123 mole) of para - (bis - β-cyanoethylamino)benzaldehyde in 175 ml. of ethanol was added 15 drops of piperidine. The solution was kept hot for two hours and then allowed to cool. Upon cooling, a light red, cloudy solution was obtained. After standing for four days, a thick red oil separated. This oil was triturated with a 5:1 benzene/acetone solution, and the acetone was distilled out, giving a red solid. This material was collected, washed with ethanol, and dried. Its weight was 1.36 g. or 44% of theoretical. It was recrystallized by dissolving in dimethylformamide and adding ethanol. The product, 4,6 - di - [p - (bis - β-cyanoethylamino)benzylidene] - 5 - oxo - 1,3 - dithiane, melted at 206°–207° C., at 432 m$\mu$, $\epsilon$=30,400 and at 320 m$\mu$, $\epsilon$=21,500.

*Analysis.*—Calculated for $C_{30}H_{28}S_2ON_6$: C, 65.20%; H, 5.10%; N, 15.21%. Found: C, 65.03%; H, 5.17%; N, 14.87%.

EXAMPLE VIII

To a solution of 0.25 g. (0.0019 mole) of 5 - oxo - 1,3-dithiane and 0.39 g. (0.0041 mole) of furfural in 10 ml. of ethanol was added six drops of piperidine. After standing for two days, gold-colored crystals separated from the solution. They were collected, washed with ethanol, and dried. The yield amounted to 0.41 g., or 76% of theoretical. The product, 4,6 - difurfurylidene-5-oxo-1,3-dithiane, was recrystallized from ethanol, melted at 149.0°–150.5° C., at 440 m$\mu$, $\epsilon$=16,500.

*Analysis.*—Calculated for $C_{14}H_{10}S_2O_3$: C, 57.94%; H, 3.47%. Found: C, 57.83%; H, 3.56%.

EXAMPLE IX

To a solution of 0.75 g. (0.0056 mole) of 5-oxo-1,3-dithiane and 1.92 g. (0.0123 mole) of 1-naphthaldehyde in 60 ml. of ethanol was added ten drops of piperidine. The solution was allowed to stand at room temperature for five days, whereupon an orange-yellow solid separated. This was collected, washed with ethanol, and dried. The yield amounted to 1.62 g. (70.6% of theory). It was recrystallized by covering with about 40 ml. of hot ethanol and adding benzene to the point of incipient precipitation. The product, 4,6 - di(1 - naphthylidene)-5-oxo-1,3-dithiane, melted at 153.5°–155° C., at 385 m$\mu$, $\epsilon$=11,500.

*Analysis.*—Calculated for $C_{26}H_{18}S_2O$: C, 76.09%; N, 4.42%. Found: C, 75.82%; N, 4.34%.

EXAMPLE X

To a solution of 0.77 g. (0.0037 mole) of 4-ethoxycarbonyl - 5 - oxo - 1,3 - dithiane and 0.25 g. (0.0019 mole) of terephthaldehyde and 15 ml. of ethanol was added six drops of piperidine and the solution was allowed to stand at room temperature for five days. The product was collected, washed with ethanol, and dried. The yield amounted to 0.61 g. (64% of theory). The product, 6,6' - terephthalylidene - bis - (4 - ethoxycarbonyl - 5-oxo - 1,3 - dithiane), melted at 180°–181° C., at 442 m$\mu$, $\epsilon$=39,250.

*Analysis.*—Calculated for $C_{22}H_{22}S_4O_6$: C, 51.77%; H, 4.35%. Found: C, 52.50%; H, 4.52%.

EXAMPLE XI

To a solution of 0.25 g. (0.0019 mole) of 5 - oxo - 1,3-dithiane and 0.25 g. (0.0019 mole) of terephthaldehyde in 12 ml. of ethanol was added five drops of piperidine, and the solution was allowed to stand at room temperature for two days. The brick-red solid, poly-4,6-terephthalylidene - 5 - oxo - 1,3 - dithiane, was collected, washed with ethanol and dried. It weighed 0.47 g., or 94% of theoretical.

EXAMPLE XII

To a solution of 1.34 g. (0.01 mole) of 5-oxo-1,3-dithiane and 3.98 g. (0.027 mole) of p-N,N-dimethylaminobenzaldehyde in 50 ml. of ethanol there was added four drops of piperidine. The solution gradually became yellow, then red, and finally a solid separated. After standing 5 days at room temperature, the crude red crystals which formed were separated and dried. The yield amounted to 1.7 g. (43% of theory). After recrystallization from benzene the product, 4,6-di[p-N,N - dimethylaminobenzylidene] - 5 - oxo - 1,3 - dithiane, melted at 252°–255° C., at 438 m$\mu$, $\epsilon$=24,391; at 327 m$\mu$, $\epsilon$=16,657, and at 258 m$\mu$, $\epsilon$=11,105.

*Analysis.*—Calculated for $C_{22}H_{24}N_2S_2O$: N, 7.07%; S, 16.17%. Found: N, 7.00%, 6.83%; S, 16.17%.

The 5-oxo-1,3-dithianes having two hydrogens each on either or both of the 4 and 6 carbons are conveniently obtained from the ketals of 4-carboxy-5-oxo-1,3-dithianes by prolonged heating at reflux with a mixture of alcohol and water at a pH of less than 7 or by first decarboxylating the free acid and then hydrolyzing the ketal by heating with water at a pH of less than 7, as described in my copending application Ser. No. 452,460, now Patent No. 2,790,811.

The 5-oxo-1,3-dithiane is prepared as follows:

A mixture of 50 ml. of water, 0.5 ml. of concentrated hydrochloric acid, and 4 g. (0.018 mole) of 6-carboxy-1,4 - dioxa - 7,9-dithiaspiro[4.5]decane, prepared as described subsequently, was heated on a steam bath for four hours. Carbon dioxide was liberated slowly and the solid gradually went into solution. A small amount of oil remained undissolved. The mixture was cooled in an ice bath to give 2.3 g. (96% of theory) of 5-oxo-1,3-dithiane, which after recrystallization from water, melted at 100°–100.5° C.

*Analysis.*—Calculated for $C_4H_6OS_2$: C, 35.80%; H, 4.51%; S, 47.78%. Found: C, 35.94%, 36.08%; H, 4.96%, 4.82%; S, 47.98%.

The infrared spectrum showed typical carbonyl bands. In water solution, an immediate precipitate was obtained with 2,4-dinitrophenylhydrazine, indicative of carbonyl groups.

The 6 - carboxy - 1,4-dioxa-7,9-dithiaspiro[4.5]decane used above was prepared as follows:

A solution of 2.5 g. (0.01 mole) of 6-ethoxycarbonyl-1,4 - dioxa - 7,9-dithiaspiro[4.5]decane, prepared as described below, and 0.8 g. (0.02 mole) of sodium hydroxide in 25 ml. of water and 15 ml. of ethanol was permitted to stand overnight, and then heated on a steam bath for five hours. This removed the alcohol by evaporation and completed the saponification. The reaction mixture was allowed to cool and acidified with concentrated hydrochloric acid. The solid acid which precipitated weighed 2 g. (90% of theory). After recrystallization from water, the product, 6-carboxy-1,4-dioxa-7,9-dithiaspiro[4.5]decane, melted at 200°–201° C. with evolution of carbon dioxide.

*Analysis.*—Calculated for $C_7H_{10}S_2O_4$: C, 37.83%; H, 4.53%; S, 28.85%. Found: C, 38.19%; H, 4.59%; S, 29.07%.

The 6 - ethoxycarbonyl-1,4-dioxa-7,9-dithiaspiro[4.5]-decane was made from 4-ethoxycarbonyl-5-oxo-1,3-dithiane as follows:

A mixture of 100 ml. of ethylene glycol and 20 g. (0.10 mole) of 4 - ethoxycarbonyl - 5-oxo-1,3-dithiane, prepared as described subsequently, was saturated with dry hydrogen chloride and the mixture heated on a steam bath for one hour. After cooling and storage overnight at ambient temperature, there was obtained 23 g. of 6-ethoxycarbonyl - 1,4 - dioxa - 7,9 - dithiaspiro[4.5]decane, which on recrystallization from ethanol melted at 59°–60° C.

*Analysis.*—Calculated for $C_9H_{14}S_2O_4$: C, 43.18%; H, 5.65%; S, 25.62%. Found: C, 43.49%; H, 5.76%; S, 25.66%.

The 4 - ethoxycarbonyl - 5 - oxo-1,3-dithiane was prepared as follows:

To solution of 0.25 mole of sodium ethoxide in 400 ml. of absolute ethanol, there was added 50.4 g. (0.2 mole) of diethyl 3,5-dithiapimelate, made as described subsequently, and the mixture heated to 75° C. for 25 minutes. After cooling, the reaction mixture was poured into an ice water/hydrogen chloride/ether mixture. The aqueous layer was extracted three times with 200 ml. portions of ether, the combined extracts dried over anhydrous magnesium sulfate, and distilled. There were obtained two fractions: (1) a liquid boiling at 109° C./0.6 mm. to 116° C./0.5 mm. and (2) a solid weighing 19 g., which, on recrystallization from ethanol, melted at 62°–64° C. which was 4-ethoxycarbonyl-5-oxo-1,3-dithiane.

*Analysis.*—Calculated for $C_7H_{10}S_2O_3$: C, 40.70%; H, 4.89%; S, 31.09%. Found: C, 40.98%, 40.67%; H, 4.95%, 4.83%; S, 31.65%, 31.57%.

In an alternative method of preparation, one-half of a solution of one mole of sodium ethoxide in 600 ml. of ethanol was added to a cold solution of 252.3 g. (one mole) of diethyl-3,5-dithiapimelate in 400 ml. of absolute ethanol. After one hour at 5° C., the remaining sodium ethoxide solution was added, the mixture allowed to stand overnight at room temperature, and then poured into an ice water/hydrogen chloride/ether mixture. The organic layer was removed and exhaustively extracted with cold aqueous sodium hydroxide. The extracts were combined, acidified with hydrochloric acid, and extracted with ether. After drying over anhydrous magnesium sulfate, the ether was removed by distillation. A crystalline product formed in the concentrate. Crystallization from alcohol gave 57.5 g. of white, crystalline 4-ethoxycarbonyl - 5 - oxo - 1,3 - dithiane, melting at 62°–64° C.

The diethyl 3,5-dithiapimelate used in the above examples was prepared by passing dry hydrogen chloride through a mixture of 120 g. (one mole) of ethyl mercaptoacetate and 40.6 g. (0.5 mole) of 37% aqueous formaldehyde at 10° C. The addition of the hydrogen chloride was stopped when the mixture became homogeneous. After standing one hour at 25° C., the reaction mixture was purified by pouring it into an ice water mixture, extracting with ether, washing the extract successively with 5% aqueous sodium hydroxide and water, then drying over anhydrous magnesium sulfate, and distilling. There was obtained 85 g. of diethyl-3,5-dithiapimelate, boiling at 122° C./0.06 mm.

When aldehydes other than formaldehyde are condensed with an alkyl mercaptoacetate in aqueous acid as above, the resulting 4-substituted dithiapimelate is ring closed with sodium alkoxide to a 2-substituted 4-alkoxycarbonyl-5-oxo-1,3-dithiane which is then acetalized with ethylene glycol, using dry HCl as above, to the corresponding 8-substituted 6-alkoxycarbonyl-1,4-dioxa-7,9-dithiaspiro-[4.5]decane. This can be hydrolyzed as above with aqueous caustic alkali to the 6-carboxy compound which is decarboxylated and hydrolyzed as above, on prolonged heating with aqueous acid to the 2-substituted-5-oxo-1,3-dithiane. Thus acetaldehyde gives the 2-methyl-, benzaldehyde the 2-phenyl-, and o-chlorobenzaldehyde the 2-(o-chlorophenyl)-5-oxo-1,3-dithiane. Similarly acetone gives the 2,2-dimethyl-5-oxo-1,3-dithiane.

When the 5-oxo-1,3-dithianes of Table I below are substituted for the 5-oxo-dithiane of Example I in the process of that example, and the aldehydes of Table I for the benzaldehyde of Example I, there are obtained the products given in Table I.

Table I

| Dithiane | Benzaldehyde | Product |
|---|---|---|
| 2-(2-Chlorophenyl)-5-oxo-1,3-dithiane. | 4-Nitrobenzaldehyde. | 2-(2-Chlorophenyl)-4-(4-nitrobenzylidene)-5-oxo-1,3-dithiane. |
| 2-Cyclohexyl-5-oxo-1,3-dithiane. | 3-4,Dichlorobenzaldehyde. | 2-Cyclohexyl-4-(3,4-dichlorobenzylidene)-5-oxo-1,3-dithiane. |
| 2,2-Dimethyl-5-oxo-1,3-dithiane. | 4-Methoxybenzaldehyde. | 2,2-Dimethyl-4-(4-methoxybenzylidene)-5-oxo-1,3-dithiane. |
| 2,2-Di(2-ethoxyethyl)-5-oxo-1,3-dithiane. | 2-Chlorobenzaldehyde. | 2,2-Di(2-ethoxyethyl)-4-(2-chlorobenzylidene)-5-oxo-1,3-dithiane. |
| 4-Butoxycarbonyl-5-oxo-1,3-dithiane. | 3-Methoxy-4-hydroxybenzaldehyde. | 4-Butoxycarbonyl-6-(3-methoxy-4-hydroxybenzylidene)-5-oxo-1,3-dithiane. |
| 4-Cyanoethyl-5-oxo-1,3-dithiane. | 4-Cyanobenzaldehyde. | 4-Cyanoethyl-6-(4-cyanobenzylidene)-5-oxo-1,3-dithiane. |
| 2-(1-Naphthyl)-5-oxo-1,3-dithiane. | 2-Chlorobenzaldehyde. | 2-(1-Naphthyl)-4-(2-chlorobenzylidene),5-oxo-1,3-dithiane. |
| 5-oxo-1,3-dithiane. | Pyridinecarboxaldehyde. | 4-Pyridylene-5-oxo-1,3-dithiane. |

In the process of the present invention any aldehyde in which the aldehyde carbon is in conjugation with an aromatic ring, i. e., with carbon which is part of a cyclic structure, may be condensed, in the presence of a basic catalyst, with any 5-oxo-1,3-dithiane having two hydrogens on either the 4 or 6 carbons. Aldehydes of the above kind usefully employable include not only those in the examples but also o-methylbenzaldehyde, 2-dimethylbenzaldehyde, 4-methoxycarbonylbenzaldehyde, 2-pyridinecarboxaldehyde, 2-thiophencarboxaldehyde, 2-pyrrolcarboxaldehyde, and the like.

The condensation between the aldehyde and 5-oxo-1,3-dithiane is effected in solution in any organic solvent and suitable solvents are ethanol, propanol, petroleum ether, diethyl ether, dioxane, and the like. The amount of solvent used is not critical but it will generally range from two to ten or even more times the combined weights of 5-oxo-1,3-dithiane and aromatic aldehyde.

The condensation between the aldehyde and 5-oxo-1,3-dithiane is effected in the presence of a basic catalyst, e. g., piperidine or triethylamine. The amount of catalyst ranges generally from $\frac{1}{60}$ to $\frac{1}{10}$ by weight of the 5-oxo-1,3-dithiane.

As a rule the reaction between the aldehyde and 5-oxo-1,3-dithiane is effected at ambient temperatures, but, if desired, temperatures above ambient may be used, for example, temperatures up to 100° C.

The time of reaction depends upon the reactants and temperature conditions used. Employing ambient temperatures, the time is generally from one to sixty days.

The substituted 5-oxo-1,3-dithianes of this invention are useful chemical intermediates by virtue of their polyfunctional nature. They are also useful as dyestuffs for cotton and leather as illustrated below:

A solution of the compound of Example IV in 5% hydrochloric acid was prepared. Cotton fabric was steeped in the solution. The fabric was then washed in water and dried. The fabric was dull maroon to salmon in color. The color was fast to soaping and resisted treatment with hypochlorite.

The above experiment was repeated with chamois with similar results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. 4,6-dibenzylidene-5-oxo-1,3-dithiane.
2. The process which comprises reacting in the presence of a basic catalyst selected from the class consisting of piperidine and trimethylamine, a 5-oxo-1,3-dithiane having two hydrogens on at least one of the 4- and 6-carbons, any other substituents on such carbons being selected from the group consisting of lower alkoxy carbonyl and cyano lower alkyl, and having attached to the 2-carbon, members selected from the group consisting of hydrogen, methyl, cyclohexyl, naphthyl, chlorophenyl and ethoxyethyl with an aldehyde $R(CH=CH)_n$—CHO, wherein $n$ is a cardinal number not greater than 2 and R is selected from the class consisting of mono- and bicyclic aryl, furyl, pyrryl, thienyl, and pyridyl.
3. The process of claim 2 in which the dithiane is 5-oxo-1,3-dithiane.
4. The process of claim 2 in which the dithiane is 5-oxo-1,3-dithiane and R and $n$ of the aldehyde formula of said claim are monoaryl and zero respectively.
5. A 5-oxo-1,3-dithiane having attached to at least one of the 4- and 6-carbons a substituent, $$R(CH=CH)_n\text{—}C=$$

in which $n$ is a cardinal number not greater than 2 and R is selected from the class consisting of mono- and bicyclic aryl, furyl, pyrryl, thienyl and pyridyl, any other substituent on such carbons being selected from the group consisting of lower alkoxy carbonyl and cyano lower alkyl and having attached to the 2-carbon, members selected from the group consisting of hydrogen, methyl, cyclohexyl, naphthyl, chlorophenyl and ethoxyethyl.
6. A dithiane in accordance with claim 5, unsubstituted on the 2-carbon and having on each of the 4- and 6-carbons the substituent, $R(CH=CH)_n$—C=, in which $n$ and R are zero and monoaryl respectively.
7. A dithiane, in accordance with claim 5, unsubstituted on the 2- and 4-carbons and having on the 6-carbon the substituent, $R(CH=CH)_n$—C=, in which $n$ and R are zero and monoaryl respectively.

References Cited in the file of this patent

UNITED STATES PATENTS 2,790,811    Howard _____ Apr. 30, 1957

OTHER REFERENCES

Marvel: J. A. C. S. 72:2106–08.